United States Patent [19]

Heath

[11] 4,369,049
[45] Jan. 18, 1983

[54] VERTICAL DRIP SEPARATOR APPARATUS AND METHOD

[76] Inventor: Rodney T. Heath, 4901 E. Main St., Farmington, N. Mex. 87401

[21] Appl. No.: 338,515

[22] Filed: Jan. 11, 1982

[51] Int. Cl.³ .............................................. B01D 51/00
[52] U.S. Cl. ........................................ 55/80; 55/219;
55/267; 55/274; 55/309; 55/319; 55/320;
55/465; 55/185
[58] Field of Search ..................... 55/169, 171, 1, 175,
55/176, 183, 185, 219, 320, 269, 319, 80, 465,
274, 309

[56] References Cited

U.S. PATENT DOCUMENTS

| | | | |
|---|---|---|---|
| 2,428,643 | 10/1947 | Young | 55/169 |
| 2,812,827 | 11/1957 | Worley et al. | 55/176 |
| 2,882,724 | 4/1959 | Smith | 55/169 |
| 2,990,691 | 7/1961 | Glasgow | 55/175 |
| 3,306,007 | 2/1967 | Glasgow | 55/185 |
| 3,541,763 | 11/1970 | Heath | 55/185 |

FOREIGN PATENT DOCUMENTS 1127824  4/1962  Fed. Rep. of Germany ........ 55/319

*Primary Examiner*—Bernard Nozick
*Attorney, Agent, or Firm*—Klaas & Law

[57] ABSTRACT

A system for preventing freezing of liquids during separation of liquids from natural gas at a natural gas well head comprising an elongated tank mounted in a vertical attitude with a lowermost portion buried in the ground below the frost line and an uppermost portion extending above the ground. A divider plate separates the tank into an upper compartment and a lower compartment. Each compartment has a liquid reservoir at the bottom thereof. An underground natural gas supply line is connected to a mid-portion of the lower compartment whereby material gas including liquids such as water and hydrocarbons flows into the lower compartment. The bottom reservoir portion of the lower compartment is connected to the bottom reservoir portion of the upper compartment by a vertical tube therewithin whereby liquids which accumulate in the lower compartment reservoir are lifted through the tube to the upper compartment reservoir by pressure of the natural gas whenever the lower inlet end of the tube is covered by liquids in the lower compartment reservoir. A heater device operated by the natural gas supplies heat to a housing surrounding the upper compartment reservoir to prevent freezing of liquids therein which are periodically automatically removed therefrom whenever a predetermined maximum volume of liquids are accumulated therein.

13 Claims, 5 Drawing Figures

VERTICAL DRIP SEPARATOR APPARATUS AND METHOD

BACKGROUND & SUMMARY OF INVENTION

This invention relates to apparatus and methods for preventing freezing of liquids during separation of liquids from natural gas at the well head. Natural gas at the well head contains liquids such as water and hydrocarbons which are removed from the natural gas by a preliminary separator apparatus and/or a secondary dehydrator apparatus such as disclosed in my prior U.S. Pat. No. 3541763. This invention is particularly directed to preliminary separator apparatus and provides the primary function of removing liquids from the natural gas while preventing freezing of the liquids. In the past, belowground apparatus has been used which has a manually operable vent system for discharging liquids collected below ground at predetermined intervals. In addition, aboveground apparatus has been used which provides for automatic venting of liquids collected above-ground which are kept from freezing by an associated heater device. Thus, prior art separator apparatus and vent controls therefor have been located either above or below ground level.

An advantage of aboveground separator apparatus and controls is that the operator can visually inspect the apparatus to determine that the apparatus is functioning properly and accumulated liquids may be automatically removed from the apparatus. A disadvantage of aboveground equipment is that, on low volume, low pressure gas wells, the flow velocity may not be great enough to keep the flow line between the well and separator swept clean of liquids and well line freezes between the well and separator may result. An advantage of belowground apparatus is that the liquids from the well line are collected below the frost line and are not as susceptible to freezing. A disadvantage of belowground apparatus is that automation of liquid discharge is difficult, fluid levels cannot be easily determined, and the operator has difficulty in determining if the apparatus is properly functioning.

The primary object of the present invention is to provide a freeze-proof preliminary separator system having an unheated first stage underground system associated with a heated second stage aboveground system. An additional object is to provide liquid discharge means for automatic transfer of liquids collected in the underground system to the aboveground system while preventing freezing of the liquids during transfer therebetween. Another object is to provide inspection means whereby operating or maintenance personnel can easily determine if the underground system is functioning properly. Other objects and advantages will be apparent from the following general and detailed descriptions of the invention.

In general, the separator system of present invention comprises an elongated cylindrical tank of relatively long length (e.g., approximately 15 feet) and relatively small diameter (e.g., approximately 1 foot) mounted in a vertical attitude with a lowermost portion of substantial length (e.g., 4 feet) buried in the ground in the vicinity of a natural gas well head. The tank is divided into upper and lower compartments by a divider plate located a relatively short distance (e.g., approximately one foot above ground level. The lower compartment has a tank inlet opening located above the bottom of the tank and beneath the divider plate so as to be connectable to an underground natural gas pipeline located beneath the frost line for a particular geographical location of a natural gas well which supplies natural gas to the separator system. The lower compartment is connected to the aboveground upper compartment by a fluid passage in a tubular member mounted in a vertical attitude in the tank in juxtaposition to a side wall portion of the tank opposite the tank inlet opening. A gas-liquid inlet opening is provided in the lower end portion of the tubular member adjacent the bottom of the tank and a gas-liquid outlet opening is provided in the upper end portion of the tubular member a substantial distance (e.g., approximately 2 feet) above the divider plate in the upper compartment. Gas and liquids, such as water and hydrocarbons, from the well head flow into the lower compartment through the tank inlet opening and downwardly toward the bottom of the tank and the tubular gas-liquid inlet opening adjacent the bottom of the tank which provides a reservoir for the liquids. When the upper level of the liquids rises above the tubular gas-liquid inlet opening, the relatively high pressure (e.g., 100 to 150 psi) of the natural gas in the lower compartment forces liquids up the tubular member to the upper compartment which provides a second liquid reservoir at the bottom thereof above the divider plate. The liquids collected in the second liquid reservoir are automatically periodically removed from the upper compartment by actuation of a conventional float operated control means whenever the level of liquids in the upper compartment rises above a predetermined maximum level. The gas in the second compartment flows upwardly through a conventional gas-liquid separator means, such as a wire mesh mist extractor device, to provide relatively dry supply gas in the upper end portion of the upper compartment which is connected to a gas discharge line through a gas outlet opening in the tank. A housing is mounted about an intermediate aboveground portion of the tank, which includes the second liquid reservoir, and a gas operated heat generating device is associated with the housing to heat and prevent freezing of the liquids and supply gas in the second reservoir and in the upper compartment. If operation of the separator system is terminated for any reason, the liquids in the first reservoir located below the ground frost line level in the lower compartment are protected against freezing.

BRIEF DESCRIPTION OF DRAWING

An illustrative and presently preferred embodiment of the invention is shown in the accompanying drawing in which.

DETAILED DESCRIPTION OF INVENTION

Figure 2:
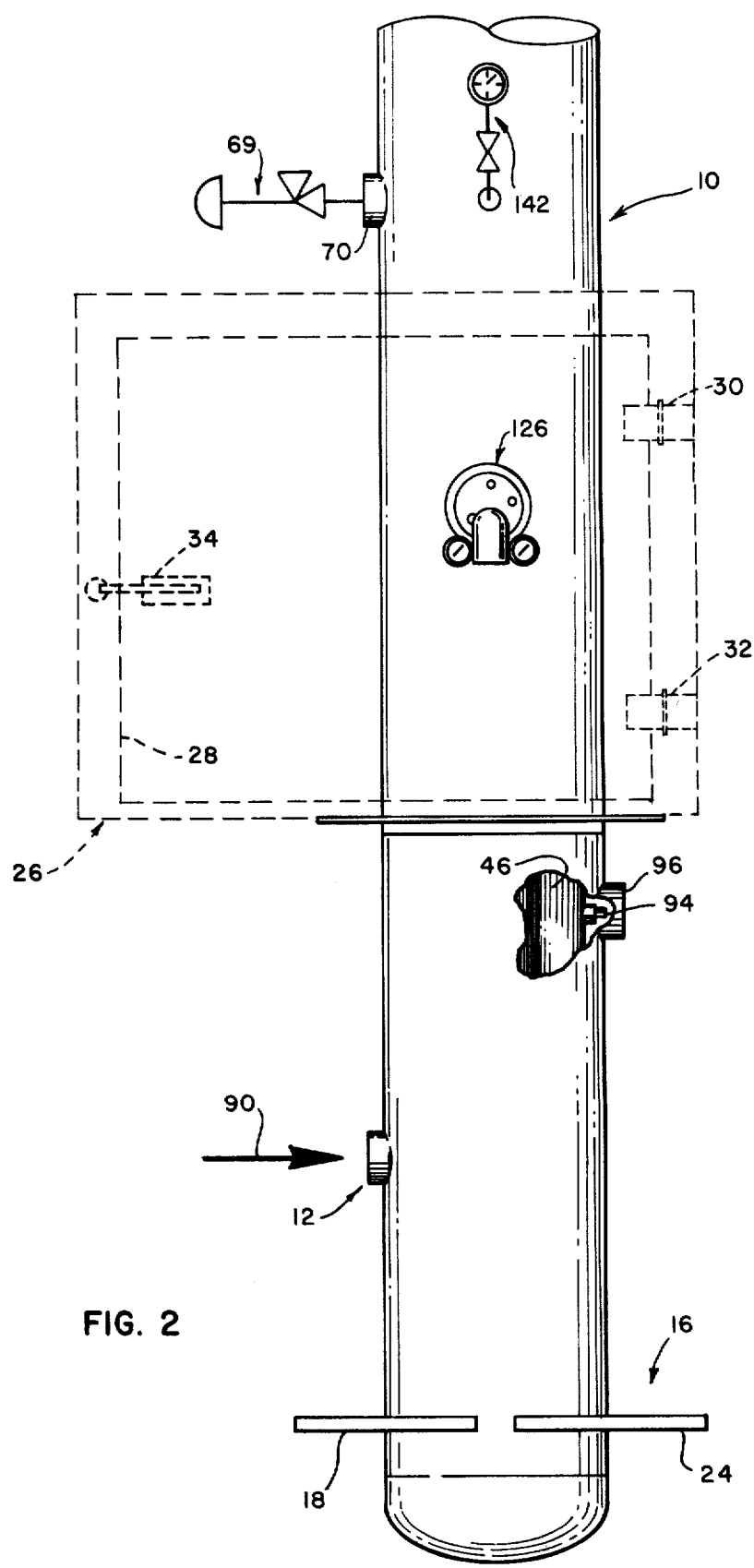
FIG. 2 is a side elevational view of a lower portion of the separator apparatus of FIG. 1.
Figure 3:
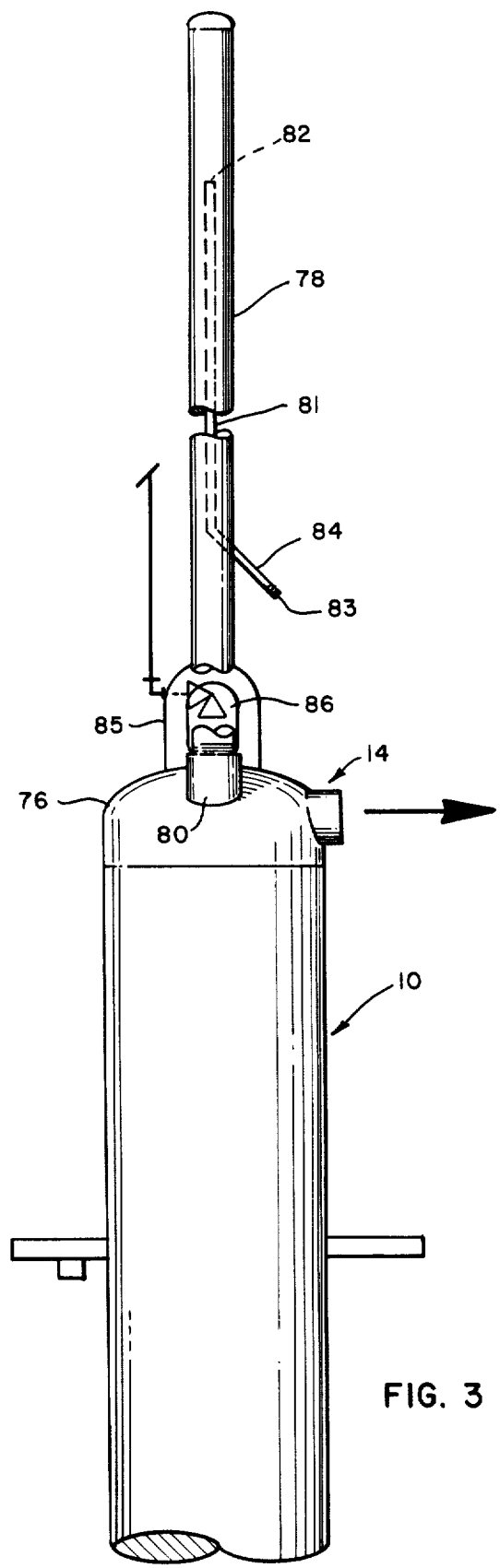
FIG. 3 is another side elevational view of an upper portion of the separator apparatus of FIG. 1.
Figure 4:
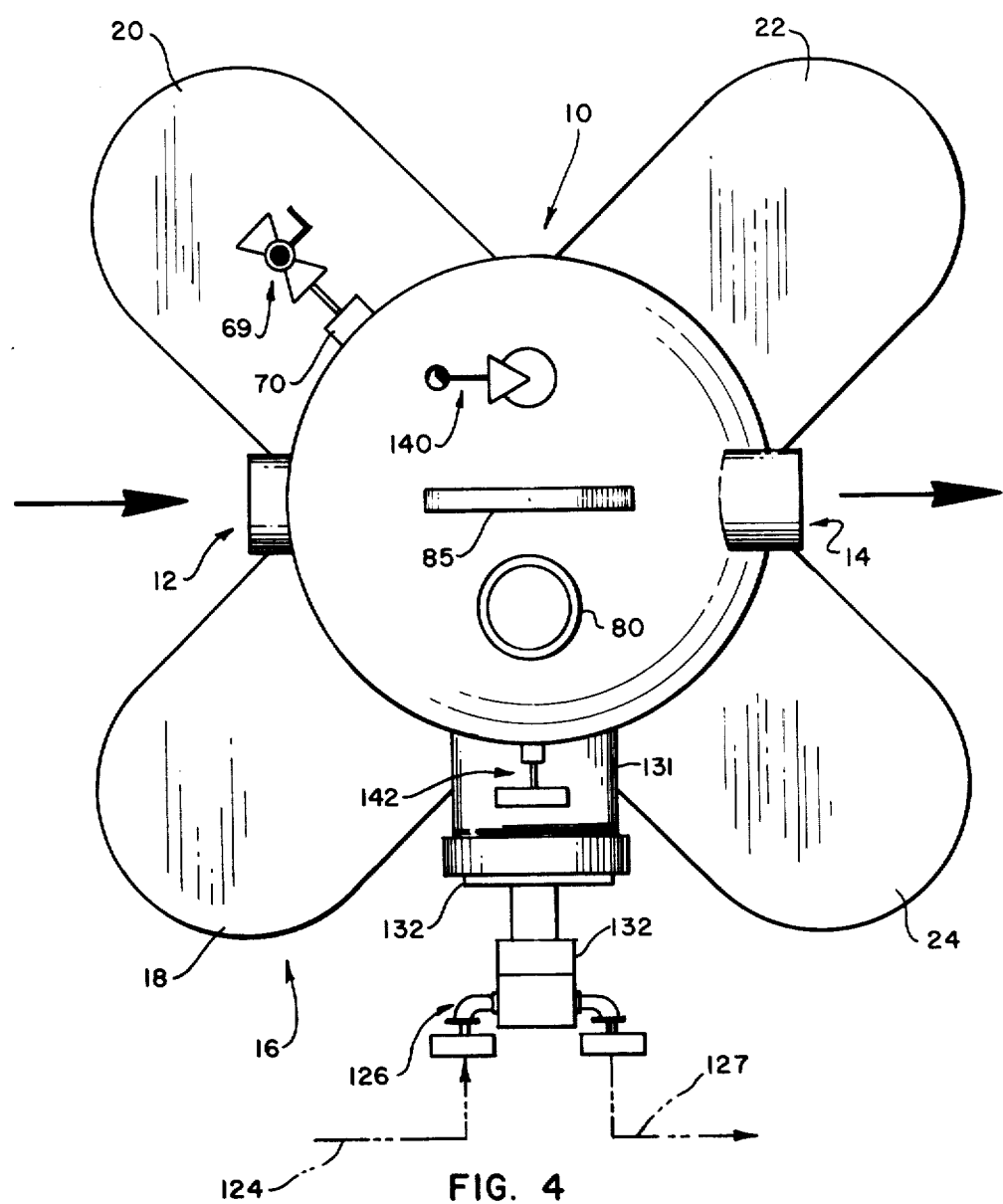
FIG. 4 is an end view of the separator apparatus of FIG. 1.

In general, as shown in FIGS. 2 & 3, the separator apparatus of the present invention comprises an elongated cylindrical tank means 10 which is adapted to be set in a vertical attitude in a hole in the ground adjacent a natural gas well head. A gas inlet opening means 12 is adapted to be connected to an underground well gas supply pipeline (not shown) located below the frost line. A gas outlet opening means 14, located above inlet opening means 12 at the top of the tank means 10, is adapted to be connected to a gas supply pipeline (not shown). A stabilizer means 16, in the form of four laterally extending plate members 18, 20, 22, 24, FIG. 4, is fixed to a lower portion of tank means 10. A housing means 26, FIG. 2, encloses an upper portion of tank means 10 and has an access door 28 mounted on hinge devices 30, 32 with a latch device 34 to hold the door closed.

Figure 5:
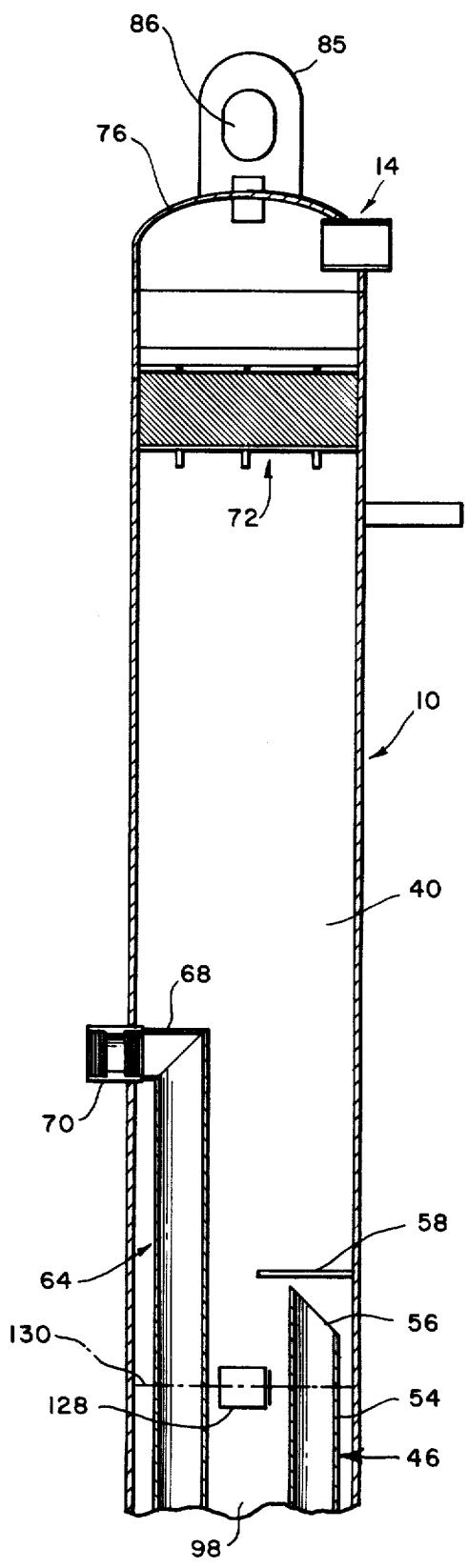
FIG. 5 is a cross-sectional view of the separator apparatus of FIG. 1.
Figure 5:
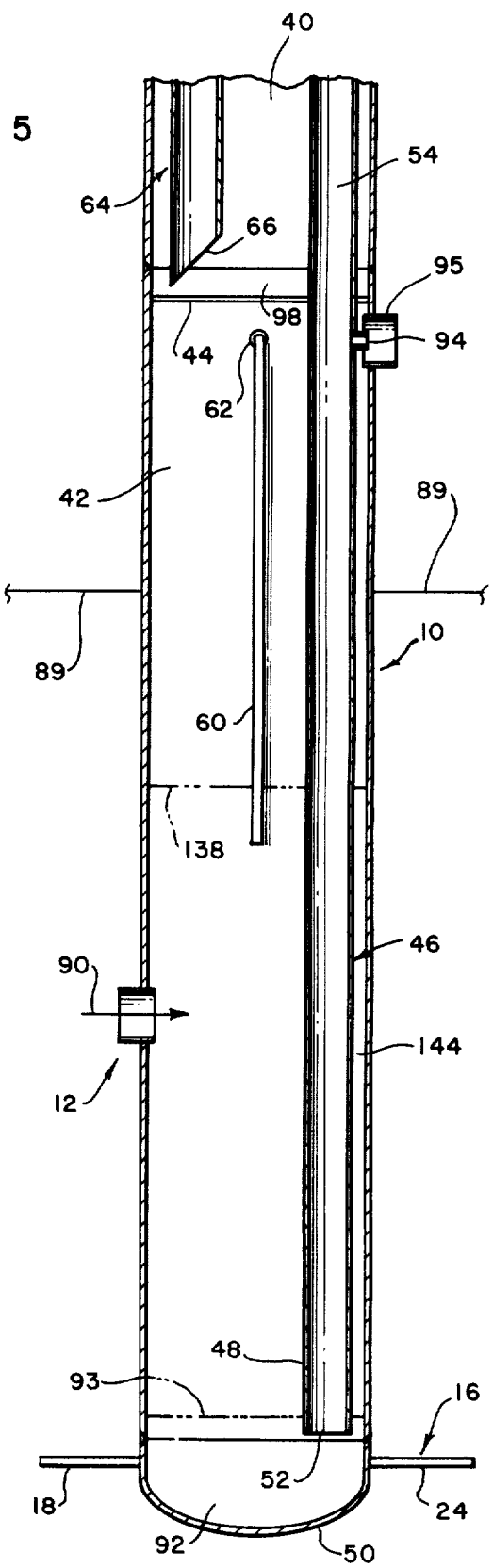

As shown in FIG. 5, tank means 10 is divided into upper and lower elongated cylindrical compartments 40, 42 by a plate member 44. A relatively small diameter tubular member 46 is fixedly mounted in tank means 10 adjacent a portion of the tank wall opposite inlet opening means 12 to provide gas-liquid discharge means for transferring gas and liquids from the lower compartment to the upper compartment as hereinafter described. Lower end portion 48 of tubular member 46 is located relatively closely adjacent a domed bottom end cap member 50 of tank means 10 and provides a downwardly facing circular fluid inlet opening 52. Upper end portion 54 of tubular member 46, which extends through and is sealed relative to plate member 44, terminates in a beveled outlet opening 56 located beneath a baffle plate means 58 fixed to the side wall of the tank means. A vertically downwardly extending dip tube member 60 is connected at the upper end below plate member 44 to a manually operable needle valve 62 through the side wall of tank means 10 to provide aboveground inspection means for determining the level of liquids in the lower compartment. A vertically extending tubular member 64 is fixedly mounted along a portion of the side wall of tank means 10 in upper compartment 40 laterally opposite tubular member 46 to provide liquid discharge means for removing liquids from the upper compartment. The lower end portion of tubular member 64 has a downwardly inwardly facing beveled opening 66 adjacent plate member 44. The upper end portion of tubular member 64 has a laterally facing portion 68 connected to a dump valve 69, FIG. 2, through a coupling member 70 mounted in the side wall of tank means 10. A conventional mist extractor means 72, such as a wire mesh block of wires of different diameters woven into mesh form, is mounted across the upper end portion of upper compartment 40 below gas outlet opening 14, connected to a pipeline (not shown). The upper end of tank means 10 is closed by a domed end cap member 76. A vertically extending tube member 78, FIG. 3, is mounted on and extends through a coupling 80 on end cap member 76. A relatively small diameter tube 81 is mounted in tube member 78 with a gas inlet opening 82 at the upper end and a gas discharge opening 83 in a lower outwardly inclined end portion 84 which extends through the outer tube 78 for connection to a heater supply gas line (not shown). A support flange member 85 having an opening 86 for attachment of a hook or cable (not shown) is mounted on end cap member 76 to support tank means 10 during installation.

In operation, with the lower tank portion located below ground level 89, well gas which may have a relatively low pressure (e.g., 100 to 150 psi or more), flows into lower compartment 42 through inlet opening 12 as indicated by arrow 90, FIG. 5. The gas then flows downwardly toward domed lower end cap member 50 which forms a freeze-proof reservoir 92 for liquids such as water and/or hydrocarbons carried into the tank means 10 with the gas from the wellhead. Whenever the upper liquid level is located above the inlet opening 52 of tubular member 46 as indicated by line 93, the gas in compartment 42 will exert pressure on the upper surface of the liquid and automatically force liquid upwardly in tubular member 46 through tubular inlet opening 52. An anti-vapor lock relief valve 94, FIG. 2, is mounted on tubular member 46 opposite an access opening coupling 95, FIG. 5, which is closed by a cover cap member 96, FIG. 2 to provide means to automatically discharge abnormally high pressure fluids back into compartment 42. When the upper liquid level 93, FIG. 5, is below opening 52, the gas flows directly through opening 52 into tubular member 46. The gas and/or liquids are discharged from tubular member 46 through outlet opening 56 below baffle plate member 58. The liquids fall into a second reservoir 98 at the bottom of the upper compartment 40 for removal through tubular member 64 and dump valve 69. FIG. 2 which is suitably connected to a remote liquid collection pit or tank (not shown). The gas flows upwardly in the upper compartment 40 through extractor means 72 to outlet open means 14.

Figure 1:
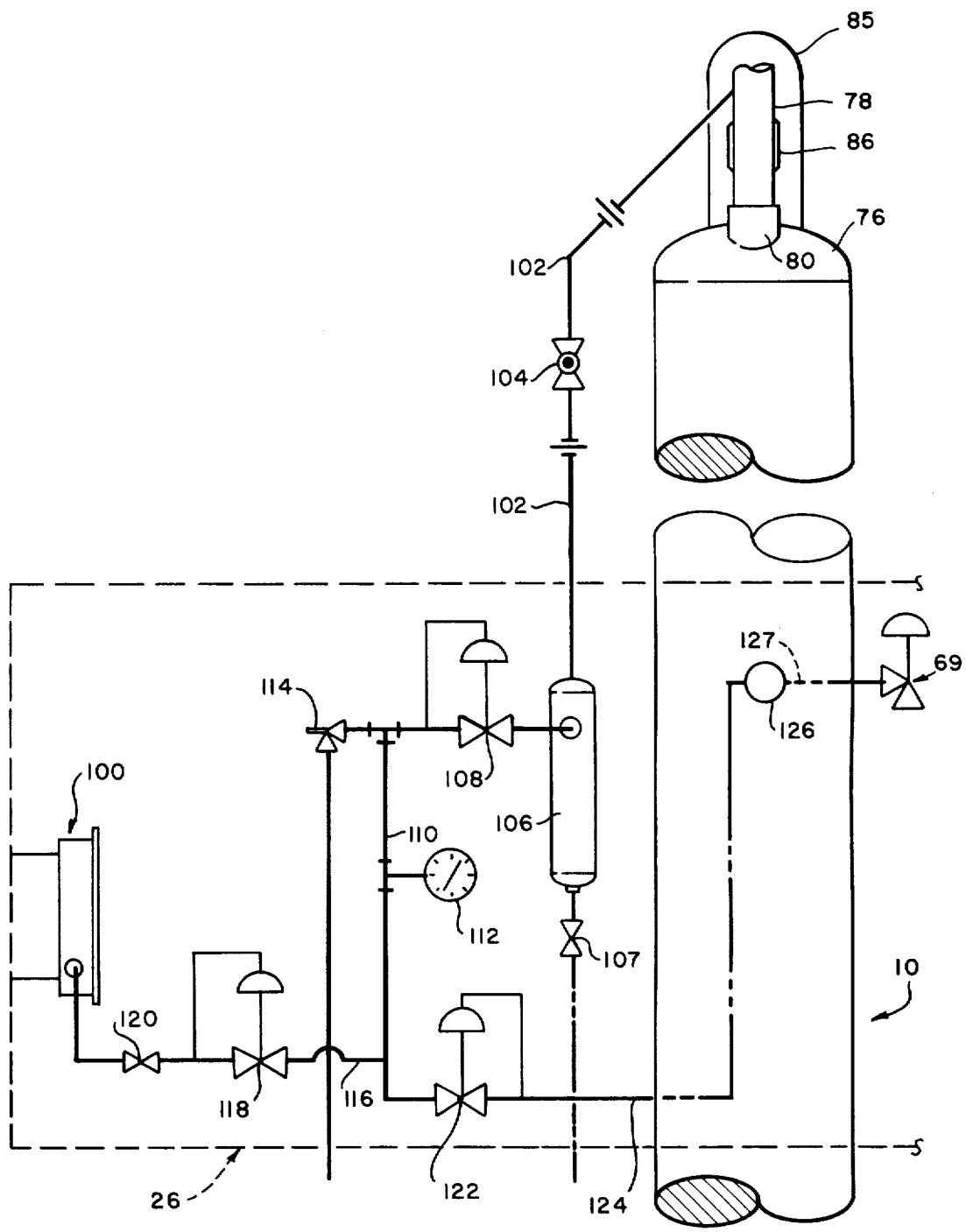
FIG. 1 is a side elevational view of an upper portion of the separator apparatus with a schematic diagram of associated equipment.

The associated equipment and control system, as illustrated in FIG. 1, comprise a conventional gas operated catalytic heater means 100 which receives supply gas from tube member 81 through a gas line 102 including a manually operable shut-off valve 104 located outside housing means 26. The supply gas flows into a conventional drip pot fluid collector means 106, which has a valved liquid discharge line 107, to a conventional relatively high pressure (e.g., 75 psi) regulator means 108 in a supply line 110 having a guage means 112 and a relief valve means 114. The pressure of gas for heater means 100 is reduced to a relatively low pressure (e.g., 3 inch to 7 inch W.C.) in a supply line 116 including a conventional regulator means 118 and a manual valve 120. Supply gas is also delivered at relatively low pressure (e.g., 20 psi) through a conventional regulator means 122 in a gas supply line 124 to a conventional automatic float operated liquid level control means 126 mounted on tank means 10.

Control means 126 has a float device 128, FIG. 5, to determine when the level of liquids in reservoir 98 rises above a predetermined maximum level indicated by line 130. The float device is connected in a conventional manner through a coupling member 131, FIG. 4, and end cap member 132 to a snap-action pilot device 132 by a torque tube (not shown) so as to control the passage of reduced pressure supply gas from line 124 to the gas operated dump valve 69 through line 127. When the float device 128 is raised, the dump valve 69 is actuated to enable liquids in reservoir 98 to flow upwardly through tube member 64, outwardly of tank means 10 through discharge opening 70. and through the dump valve 69 to a collection pit. The pressure of the gas in compartment 40 acts on the upper surface of the liquids to assist in causing flow of liquids to the collection pit. The outlet opening 56 of tubular member 46 is beveled and faces away from float device 128 so that liquids will be discharged toward the side wall portion of tank means 10. The dip tube 60 extends downwardly in lower compartment 42 below ground level 89, while manually operable valve 62 is located above ground level to enable field personnel to check the liquid level in lower compartment 42 by manual actuation of valve 62. Unless the lower end of the dip tube is covered by liquids in reservoir 92 as indicated by line 138, gas will be vented through valve 62 to indicate that the apparatus is functioning properly with liquids collected in reservoir 92 being discharged to upper compartment 40 through tube 46. A pressure relief valve means 140, FIG. 4, may be mounted on upper end cap member 76 and a pressure guage 142 may be mounted on the side of tank means 10.

The lower liquid reservoir is located a substantial distance beneath inlet opening 12 so that gas and liquids are continuously swept out of the underground well head supply line into the lower compartment 42 to prevent freezing in the supply line. The lower liquid reservoir is also located a substantial distance beneath ground level 89 so as to be beneath the frost line where accumulated liquids will not freeze. Tank means 10 is made of relatively thick wall (e.g., approximately ⅜ to ½ inch thick) steel material so as to insulate the lower reservoir. Tube member 46 is mounted in spaced relationship to the side wall portion of tank means 10 to provide a gap 144, FIG. 5, so as to be insulated from the tank wall. Heated housing means 26 may be insulated to assure good heat transfer to the aboveground portion of the tank wall which surrounds the upper compartment liquid reservoir. Since the lower and upper compartments are directly vertically aligned, the system is extremely compact, there are no controls or moving parts below ground, fluid flow effeciency is maximized, and heat loss is minimized while enabling access to all control and inspection apparatus by field personnel.

While an illustrative and presently preferred embodiment of the invention has been illustrated and described herein, it is intended that the scope of the appended claims be construed to include alternative embodiments except insofar as limited by the prior art.

The invention claimed is:

1. A separator system for separating liquids from natural gas at the well head of a natural gas well comprising:
    an elongated tank means for being mounted in a vertical attitude with a lower portion buried in the ground below the frost line and an upper portion extending above the ground;
    divider plate means in said tank means for dividing said tank means into an upper compartment and a lower compartment;
    a lowermost liquid reservoir means at the lower end of said tank means for receiving and holding liquids at the lower end of said lower compartment of said tank means;
    a well gas inlet means in said lower portion of said tank means for connecting a well gas line buried in the ground to said lower compartment of said tank means above said lowermost liquid reservoir means;
    a gas-liquid passage tubular means mounted in said tank means for providing a fluid passage between said lower compartment and said upper compartment and having a lowermost gas-liquid inlet portion located in said lowermost liquid reservoir means and an intermediate portion extending through said divider plate means and an uppermost gas-liquid outlet portion located in said upper compartment of said tank means for enabling upward flow of well gas in said lower compartment and liquids accumulated in said lowermost liquid reservoir means from said lowermost gas-liquid inlet portion to said uppermost gas-liquid outlet portion soley by force of the pressure of the well gas in said lower compartment;
    said divider plate means being sealed relative to said tubular gas-liquid passage means and said tank means to provide an uppermost liquid reservoir means at the lower end of said upper compartment of said tank means for holding liquids discharged from said uppermost gas-liquid outlet portion of said tubular gas-liquid passage means;
    liquid removal means for removing liquid from said uppermost liquid reservoir means to maintain a liquid level therein located below said uppermost gas-liquid outlet portion of said tubular gas-liquid passage means and for discharging liquid from said upper compartment of said tank means;
    heating means associated with said uppermost liquid reservoir means for supplying heat thereto to prevent freezing of liquids accumulated therein; and
    gas outlet means located above said uppermost liquid reservoir means for receiving and discharging well gas from said upper compartment of said tank means to a gas pipeline.

2. The invention as defined in claim 1 and further comprising:
    a baffle means above said upper outlet portion of said first tubular means for directing liquids downwardly toward said divider plate means while enabling upward flow of well gas in said upper compartment of said tank means.

3. The invention as defined in claim 1 and further comprising:
    liquid extractor means mounted in an upper portion of said upper compartment of said tank means for receiving well gas from said uppermost gas-liquid outlet portion of said tubular gas-liquid passage means and removing liquids from the well gas.

4. The invention as defined in claim 1 and wherein said heating means comprising:
    a housing surrounding the side wall portion of said tank means opposite said uppermost liquid reservoir means and being in substantially sealed relationship relative thereto; a gas operated heating device associated with said housing to heat the interior of said housing; and gas supply means connected to the upper portion of said upper compartment and to said gas operated heating device for supplying gas thereto.

5. The invention as defined in claim 1 and further comprising: pressure relief valve means mounted above ground level on an upper side wall portion of said tubular gas-liquid passage means for enabling discharge of gas-liquid in said tubular gas-liquid passage means back into said lower compartment above liquids accumulated therein when abnormally high pressure conditions exist in said tubular gas-liquid passage means to thereby prevent vapor-lock therewithin.

6. The invention as defined in claim 1 and further comprising: stabilizer means mounted on a lower portion of said tank means beneath the ground level for maintaining said tank means in a vertical upright position after being buried in the ground.

7. The invention as defined in claim 1 and further comprising:
    liquid level indicator means for determining when liquid levels in said lower compartment are above a predetermined maximum abnormal liquid level whereat flow of gas and liquids through said tubular gas-liquid passage means has terminated and for providing an indication of such abnormal level at a location above ground level.

8. The invention as defined in claim 7 and wherein said liquid level indicator means comprising:
   a tube means having a gas passage and extending downwardly into said lower compartment and having an inlet opening located at said abnormal liquid level whereby gas in said lower compartment above liquids in said lower compartment can flow into said gas passage until said inlet opening is immersed in the liquid; and a valve means connected to the upper end portion of said tube means and being located above ground whereby the absence of flow of gas through said passage indicates said abnormal liquid level.

9. The invention as defined in claim 1 and wherein said liquid removal means comprises:
   a tubular liquid passage means mounted in a vertical attitude adjacent a portion of the side wall of said tank means opposite said tubular gas-liquid passage means for providing a flow passage for discharge of liquids accumulated in said uppermost liquid reservoir means;
   a liquid inlet opening at the lower end portion of said tubular liquid passage means and being located in said uppermost liquid reservoir means adjacent said divider plate means and below said uppermost gas-liquid outlet opening of said tubular gas-liquid passage means;
   a liquid outlet opening at the upper end portion of said tubular liquid passage means extending through said tank means and being located above said uppermost gas-liquid outlet opening of said tubular gas-liquid passage means whereby pressure of gas in said upper compartment on the upper surface of liquids in said uppermost liquid reservoir forces liquids to flow up said tubular liquid passage means to said liquid outlet opening while maintaining a liquid seal across said liquid inlet opening to prevent escape of gas through said liquid outlet opening.

10. The invention as defined in claim 9 and further comprising:
    a baffle means mounted in said upper compartment above said gas-liquid outlet opening in said tubular gas-liquid passage means for deflecting liquids downwardly toward said uppermost liquid reservoir means while enabling upward flow of gas relative thereto.

11. The invention as defined in claim 9 and wherein said liquid removal means further comprises:
    a gas operated dump valve means for controlling flow of liquids through said tubular liquid passage means to said liquid outlet opening from said uppermost liquid reservoir means; and
    a control means, including a float device in said uppermost liquid reservoir means, for automatically controlling operation of said dump valve means in accordance with the level of liquids in said upper liquid reservoir means.

12. The method of separation of liquids from natural gas at a well head comprising the steps of:
    flowing natural gas from a supply line connected to the well head into a lowermost compartment located in the ground beneath the frost line to prevent freezing of liquids therewithin;
    accumulating liquids in the bottom of the lowermost compartment until the liquids reach a predetermined maximum level while causing the natural gas to flow upwardly to an uppermost compartment located above ground level;
    causing the natural gas to apply pressure to the upper surface of liquids accumulated in the bottom of the lowermost compartment when the liquids reach the predetermined maximum level and using only the pressure of the natural gas to cause upward flow of liquids to the uppermost compartment until the level of accumulated liquids is reduced below the predetermined maximum liquid level;
    accumulating liquids in the uppermost compartment until there is a predetermined maximum liquid level therein while enabling upward flow of gas therein to a gas outlet opening therein and then removing liquids from the uppermost compartment until there is less than the predetermined maximum liquid level therein; and
    heating the accumulated liquids in the uppermost compartment to prevent freezing thereof.

13. The invention as defined in claim 12 and further comprising:
    baffling the gas-liquid flow into the upper compartment whereby liquids are deflected downwardly toward the bottom of the upper compartment while enabling gas to flow upwardly toward the upper portion thereof.

* * * * *